Figure 1:
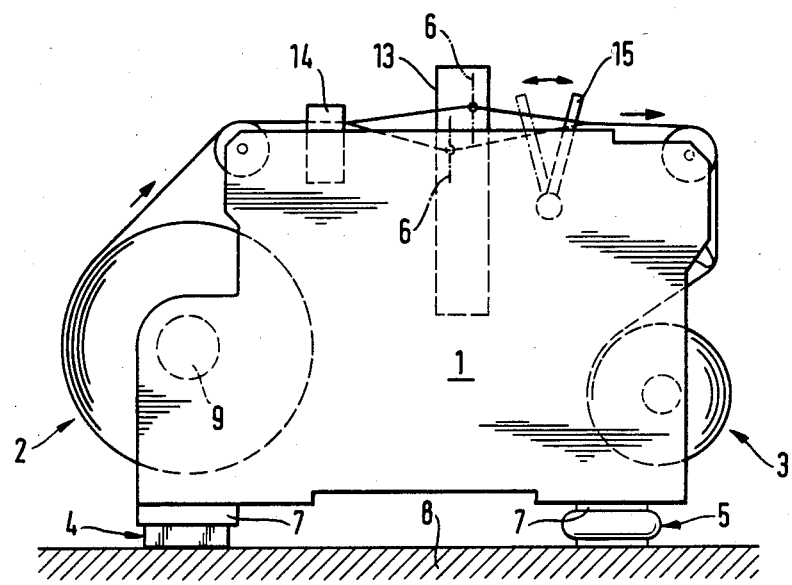

United States Patent
Bolleter et al.

[11] Patent Number: 4,587,995
[45] Date of Patent: May 13, 1986

[54] VIBRATION-INSULATING AND VIBRATION-DAMPING SUSPENSION FOR A WEAVING MACHINE

[75] Inventors: Ulrich Bolleter, Seuzach; Werner Schaad, Schaffhausen, both of Switzerland

[73] Assignee: Sulzer Brothers Limited, Winterthur, Switzerland

[21] Appl. No.: 658,780

[22] Filed: Oct. 9, 1984

[30] Foreign Application Priority Data

Oct. 19, 1983 [EP] European Pat. Off. ......... 831104039

[51] Int. Cl.$^4$ ................................................. D03J 1/00
[52] U.S. Cl. ..................................... 139/1 R; 248/619; 248/621; 248/633
[58] Field of Search ............... 139/1 R; 248/550, 559, 248/562, 615, 619, 621, 631, 633, 638

[56] References Cited

U.S. PATENT DOCUMENTS

| | | | |
|---|---|---|---|
| 3,160,376 | 12/1964 | Kennedy et al. | 139/1 R |
| 3,282,543 | 11/1966 | Engels | 248/633 |
| 3,347,277 | 10/1967 | Gwinn | 139/1 R |
| 3,927,854 | 12/1975 | Carey | 248/621 |

FOREIGN PATENT DOCUMENTS

| | | | |
|---|---|---|---|
| 1149373 | 4/1969 | United Kingdom | 248/621 |
| 2021403 | 12/1979 | United Kingdom | 248/621 |

Primary Examiner—Henry S. Jaudon
Attorney, Agent, or Firm—Kenyon & Kenyon

[57] ABSTRACT

The suspension for the weaving machine employs vibration-damping bearing elements which have vertical spring constants which differ from each other by at least one order of magnitude. In addition, the sum of the horizontal spring constants of the bearing elements are, at most, one tenth of the greatest vertical spring constants of the bearing elements. The bearing element on the warp beam side is made as a layer bearing while the soft bearing element on the cloth beam side is in the form of an air spring which can be adjusted.

The suspension achieves a defined static position of the weaving machine as well as a deep tuning of the suspension system of the machine/bearing elements.

12 Claims, 2 Drawing Figures

VIBRATION-INSULATING AND VIBRATION-DAMPING SUSPENSION FOR A WEAVING MACHINE

This invention relates to a vibration-insulating and vibration-damping suspension for a weaving machine.

As is known, vibrations which are excited in weaving machines may well cause damage at the site of installation of the weaving machine. For instance, cracks may form on and in a building in which the weaving machine is installed. Moreover, problems may arise in the surrounding neighborhood if a weaving operation is close to a residential zone since the vibrations can propagate beyond the building into surrounding area.

As is known, a main cause of weaving machine vibrations are the reaction forces which result during a slay movement. Such vibrations are also dependent on the rotational speed of the weaving machine.

As is known, the masses which are supported on the side of the weaving machine on which a warp beam is supported are known to vary, for example, between 50 and 1500 kilograms (kg) while on an opposite cloth beam side, the masses may vary, for example, in the range between 20 and 150 kilograms (kg). Accordingly, different and, in part, opposite requirements are needed for the suspension on of weaving machines.

On the one hand, the suspension of a weaving machine requires that the weaving machine occupy a defined static position in a machine room regardless of the operating state. In order to obtain this static position, the machine should rest on a hard support. However, on the other hand, in order to prevent transmission of the vibration energy of the machine to the building in which the machine room is disposed, the weaving machine must be mounted relatively softly. This makes the desired static position at least doubtful.

Aside from structural measures, various vibration-insulating and vibration-damping devices have been known in which an equalization of masses is attempted by setting up two machines with opposite slay movements on a common frame, for example as described in German GM No. 7407252. In other cases, weaving machines have been suspended from cables, for example as described in U.S. Pat. No. 3,347,277 and 4,153,266. However, both measures are complex and trouble-prone and, therefore, have not been used in practice.

It has also been known to achieve a vibration damping or insulation of a weaving machine relative to a building by the insertion of vibration-damping elements between the weaving machine and a floor, such as described in German A.S. No. 1535366; U.S Pat. No. 3,749,340 and Swiss PS No. 514,087. However, the results obtained with such elements until now have been unsatisfactory because a vibration-insulating assembly of the machine requires a soft suspension. Further, there are leveling problems which arise and there is a danger with a soft suspension that—especially due to elevated rotational speeds in machines of the latest model—the excitation forces or, respectively, their frequencies, brought about mainly by the slay movement, will resonate with the natural vibrations of the weaving machine (regarded as a rigid body).

For a proper suspension of a weaving machine, the natural frequency of the rigid body must be clearly below the first order of the excitation forces or moments caused by the slay movement. Hence, the assembly of the machine must be made with "deep tuning", i.e. the natural frequency of the system machine/bearing elements must be selected so that, in operation, the excitation is hypercritical. In other words, the spring constants must be selected as a function of the weaving machine mass, the center of gravity and the moments of inertia in such a way that the lowest rigid body natural frequencies of the weaving machine are substantially below the operating rotational speed.

Accordingly, it is an object of the invention to provide a suspension for a weaving machine which is able to prevent transmission of vibration energy while permitting the machine to remain in a static position during operation.

It is another object of the invention to provide a relatively simple suspension for mounting a weaving machine on a floor in a vibration-insulation and vibration-damping manner.

Briefly, the invention provides a vibration-insulating and vibration-damping suspension for a weaving machine which is comprised of at least one bearing element for supporting a warp beam side of the weaving machine and at least a second bearing element for supporting a cloth beam side of the weaving machine with the bearing elements having spring constants which differ from each other at least in a vertical direction by at least one order of magnitude, that is, by at least a multiple of ten.

Where the weaving machine includes a slay between the warp beam side and cloth beam side as well as heddles, one bearing element is in the form of a hard vertical spring suspension located on the side farther away from the slay. This assures that the requirement of a defined static position of the weaving machine can be met while a softer vertical vibration bearing element on the weaving machine side closest to the slay fulfills the requirement concerning the "tuning".

In the great majority of weaving machine constructions, the greatly varying masses on the warp beam side are supported within the weaving machine. Therefore, it is advantageous, if the hard bearing elements with high vertical spring constants are arranged on the warp beam side. Also, it may be appropriate in this case if the machine has feet which are supported on the bearing elements directly below the bearing means for a warp beam. In this case, the static position of the weaving machine will be practically independent of the momentary warp beam mass.

Optionally, the warp beam and/or the cloth beam can be set up separately to relieve the weaving machine of the varying forces due to inertia. In such a case, bearing elements with vertical spring constants differing by at least one order of magnitude may be used to achieve a simple and durable leveling of the machine. If a hard suspension is chosen for the side farther away from the slay, a "soft" bearing element may be positioned closer to the vibration exciter, i.e. the slay, so as to have a relatively short lever arm.

Advantageously, the vertical spring constants on the side of the heddles farther removed from the slay drive are at least 50 times those on the other side. The magnitude of the "multiplication factor" for the vertical spring constants depends on limit conditions, such as the type of foundations, permissible maximum amplitude of the forced machine vibration, and the amount of the dynamic foot forces, i.e. those produced by the vibrations.

Furthermore, the suspension should be as soft as possible with respect to horizontal vibrations. To this end, the sum of the spring constants for the tuning for horizontal vibrations is at most 1/10 of the greatest spring constants for tuning for the vertical vibrations. Thus, a separation of the horizontal vibrations from the vertical vibrations takes place.

As "soft" bearing elements, air springs are especially suitable. However, commercial volume-compressible elastomers, for example of polyurethane, may also be used for this purpose. Other possibilities are combined damper elements containing plastic shock absorbers with spiral springs, rubber springs, one or more serially arranged cup springs, pretensioned steel springs, as well as a combination of several of these elements.

The requirements of the "hard" bearing elements, possibly subjected to relatively strong static load fluctuations, are high spring constants in the vertical direction and low spring constants in the horizontal direction. Here, so-called layer bearings as known from bridge construction have proved especially suitable. Such a layer bearing includes metal plates or sheet embedded between plastic discs. The number of metal plates, thickness and material (Shore hardness) of the intermediate layers of plastic, and the shape and size of the element permit a broad range of values of the horizontal and vertical spring constants.

An especially advantageous combination results from the use of the layer bearings on the "hard" side and of commercially available air springs on the "soft" side, as this eliminates the effect of an uneven floor, since the dimensions of the "hard" elements are very small, and the air spring is independent of locally slanting floors. Furthermore, this combination permits easy leveling of the machine, in that the machine is first set down on the hard elements and then leveled by selection of a suitable air pressure in the air springs of the other side.

Besides, in the "normal case", i.e. for machines where the warp and cloth beams are supported by the machine, the position of the machine can be readjusted at any time, if, for example under major changes in the textile material masses on the cloth side, the static position of the weaving machine should change unduly. For this purpose, the pressure in the air springs can be varied or regulated automatically or manually.

Figure 2:
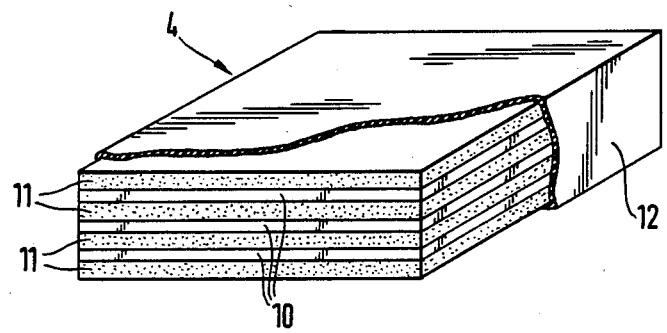

These and other objects and advantages of the invention will become more apparent from the following detailed description taken in conjunction with the accompanying drawings wherein:

FIG. 1 diagramatically illustrates a side view of a weaving machine mounted on a suspension in accordance with the invention; and FIG. 2 illustrates a layer bearing employed in the suspension of FIG. 1.

Referring to FIG. 1, the weaving machine is of conventional construction and includes, inter alia, a side cheek 1 which has a pair of feet 7 at opposite ends for resting on a floor 8. As indicated, the weaving machine has heddles 6 and heddle guides 13 which project upwardly above the cheek 1 along with a warp stop motion 14 and a slay 15 which are shown schematically. The weaving machine carries a warp beam 2 in a bearing means 9 on one side as well as a cloth beam 3 at the opposite side.

As shown in FIG. 1, the weaving machine rests on the floor 8 by means of a vibration-insulating and vibration-damping suspension which includes bearing elements 4,5.

The bearing element 4 on the warp beam side of the weaving machine is arranged vertically under the warp beam bearing means 9 and a foot 7. As shown in FIG. 2, the bearing element 4 is constructed in a manner of a layer bearing which is used in bridge construction. That is, the layer bearing consists of one or more metal sheets 10, for example steel sheet, on to which plastic layers 11 of oil-resistant plastic, e.g. of chloroprene rubber, are vulcanized. The stability to oil is necessary because oil droplets may fall unto the layer bearing during operation of the weaving machine. In addition, the sheets 10 and layers 11 are complete by enveloped by a plastic layer 12, likewise of chloroprene rubber, in order to protect the steel sheets 11 from corrosion.

The bearing element 5 on the cloth beam side of the weaving machine is in the form of a commercially available air bearing which consists of an elastic bellows filled with more or less air. By varying the air pressure in the bearing element 5, the machine can be leveled and maintained in an adjusted position even if the masses on the cloth side vary greatly.

the bearing elements 4, 5 of the suspension have spring constants which differ from each other at least in a vertical direction by at least one order of magnitude, for example, the bearing element 4 may have a spring constant at least 50 times that of the "soft" bearing element 5.

By way of example, the bearing element 4 may have a vertical spring constant $k_v$ of about $21 \times 10^6$ N/m and a horizontal spring constant $k_h$ of about $0.5 \times 10^6$ N/m. The bearing element 5 may have a vertical spring constant $k_v$ of approximately $0.35 \times 10^6$ N/m; and a horizontal spring constant $k_h$ of approximately $0.88 \times 10^5$ N/m.

The vertical spring constant $k_v$ of element 4 is at least one order of magnitude greater than that of element 5.

The sum of the spring constants of the bearing elements 4,5 for horizontal vibrations is also, at most, one tenth of the greatest spring constants for vertical vibrations.

The invention thus provides a relatively simple suspension for mounting a weaving machine on the floor to not only provide a static mounting, but also to damp out vibrations from the machine.

What is claimed is:

1. In combination
   a weaving machine having at least one foot on a warp side and at least one foot on a cloth side; and
   a vibration-insulating and vibration-damping suspension for said weaving machine, said suspension including a first bearing element supporting said warp side foot thereon and a second bearing element supporting said cloth side foot thereon, said bearing elements having spring constants which differ from each other at least in a vertical direction by at least one order of magnitude.

2. The combination as set forth in claim 1 wherein said first bearing element has a vertical spring constant at least 50 times said vertical spring constant of said second bearing element.

3. The combination as set forth in claim 1 wherein the sum of the spring constants for tuning for horizontal vibrations is at most one tenth of the greatest spring constants for tuning for vertical vibrations.

4. The combination as set forth in claim 1 wherein said first bearing element has a higher vertical spring constant than said second bearing element.

5. The combination as set forth in claim 4 wherein said weaving machine includes bearing means for receiving a warp beam and wherein said warp side foot and said first bearing element are vertically disposed under said bearing means.

6. The combination as set forth in claim 1 wherein said first bearing element is a layered bearing.

7. The combination as set forth in claim 6 wherein said second bearing element is an air spring.

8. The combination as set forth in claim 1 wherein said weaving machine includes a slay between said sides and wherein said second bearing element is closer to said slay than said first bearing element.

9. A vibration-insulating and vibration-damping suspension for a weaving machine comprising at least one bearing element for supporting a warp beam side of a weaving machine thereon, said bearing element having a predetermined spring constant; and at least a second bearing element for supporting a cloth beam side of the weaving machine thereon, said second bearing element having a spring constant which differs from said spring constant of said one bearing element at least in a vertical direction by at least one order of magnitude.

10. A suspension as set forth in claim 9 wherein said one bearing element has a spring constant at least 50 times that of said second bearing element.

11. A suspension as set forth in claim 10 wherein said one bearing element is a layered bearing and said second bearing element is an air spring.

12. A suspension as set forth in claim 10 wherein the sum of the spring constants of said elements for horizontal vibrations is at most one tenth of the greatest spring constants for vertical vibrations.

* * * * *

UNITED STATES PATENT AND TRADEMARK OFFICE
CERTIFICATE OF CORRECTION

PATENT NO. : 4,587,995

DATED : May 13, 1986

INVENTOR(S) : Ulrich Bolleter and Werner ScHaad

It is certified that error appears in the above-identified patent and that said Letters Patent is hereby corrected as shown below:

Column 1, line 15 after "into" insert -the-

Column 1, line 27 delete "on"

Column 3, line 29 change "a" to -an-

Column 4, line 8 change "unto" to -onto-

Column 4, line 10 change "complete by" to -completely-

Signed and Sealed this

Third Day of February, 1987

Attest:

DONALD J. QUIGG

Attesting Officer

Commissioner of Patents and Trademarks